United States Patent [19]

Rukavina et al.

[11] Patent Number: 4,478,009
[45] Date of Patent: Oct. 23, 1984

[54] AUTOMATIC CONTROL SYSTEM FOR MACHINE TOOLS

[76] Inventors: Daniel M. Rukavina, 3873 9th ST.; David H. Arnold, 1711 Gilmore, both of Winona, Minn. 55987

[21] Appl. No.: 904,210

[22] Filed: May 9, 1978

[51] Int. Cl.³ .......................... H02P 7/68; B23Q 5/10; B24B 51/00
[52] U.S. Cl. .................................... 51/165.8; 318/571; 318/39; 318/608; 51/165.92
[58] Field of Search .................... 318/34, 39, 599, 571, 318/608, 432, 9, 10, 54, 65, 85, 101, 103, 104, 519

[56] References Cited

U.S. PATENT DOCUMENTS

| | | | |
|---|---|---|---|
| 3,372,322 | 3/1968 | Lockwood et al. | 318/39 |
| 3,626,262 | 12/1971 | Kelling | 318/39 |
| 3,699,720 | 10/1972 | Lenning | 318/571 |
| 3,962,619 | 6/1976 | Nishimura | 318/39 |
| 4,013,932 | 3/1977 | Aggarwal | 318/39 |
| 4,031,437 | 6/1977 | Dempsey | 318/39 |

FOREIGN PATENT DOCUMENTS

| | | | |
|---|---|---|---|
| 911982 | 12/1962 | United Kingdom | 51/165.77 |
| 1455746 | 11/1976 | United Kingdom | 318/571 |

*Primary Examiner*—B. Dobeck
*Attorney, Agent, or Firm*—Dennis Kreps

[57] ABSTRACT

An automatic control system for machine tools having rotary tools is disclosed in which the tool drive motor load current, which is proportional to the mechanical load on said drive motor, is maintained at a selectable desired level by controlling the duration and phase of the power supplied to an alternating current feed motor which controls the distance between the rotary tool and the workpiece. A sensed load signal which is greater than the preselected level will cause the feed motor to move the tool away from the workpiece, while a load signal less than that desired will cause the feed motor to move the tool toward the workpiece.

2 Claims, 7 Drawing Figures

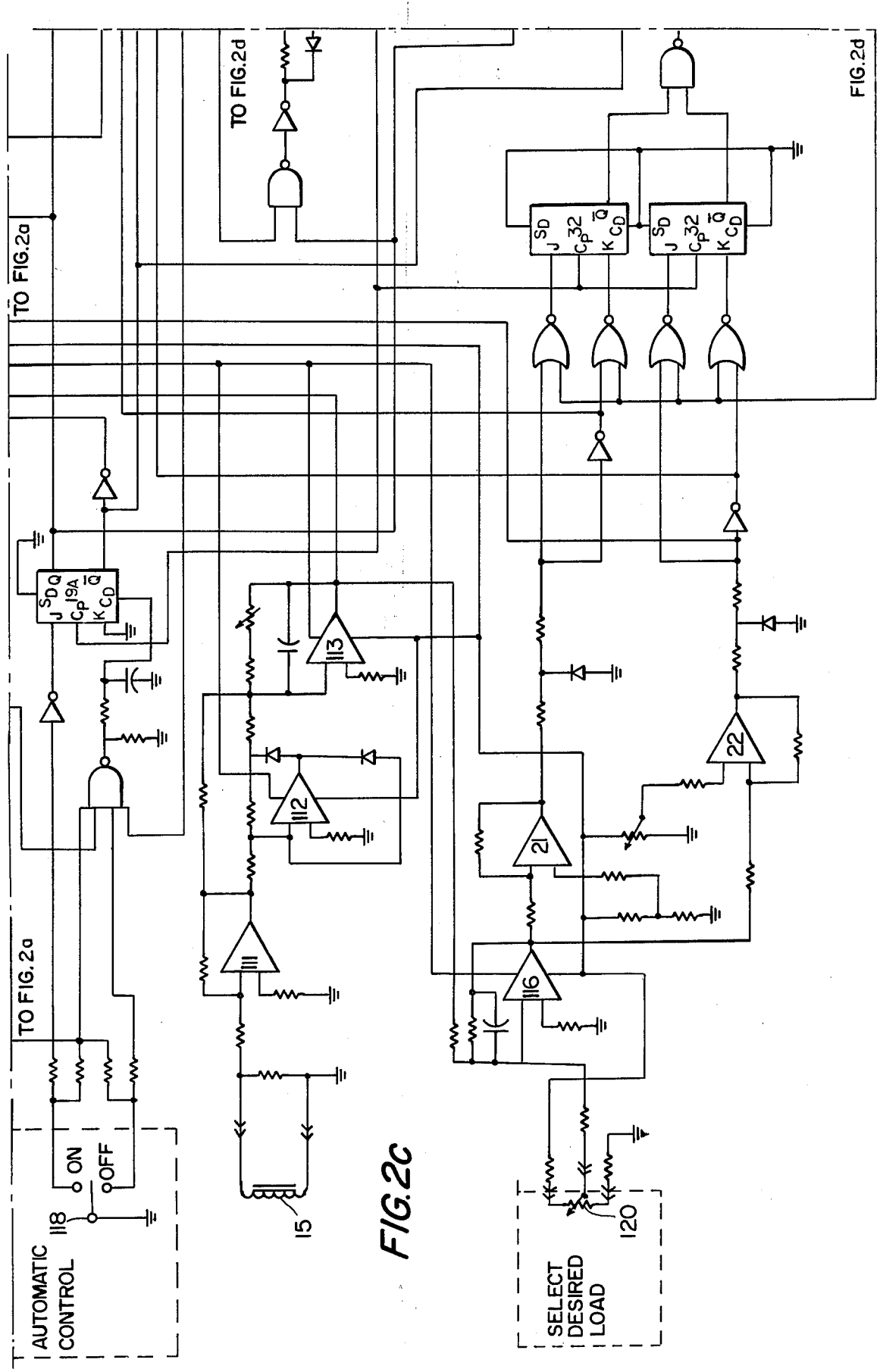

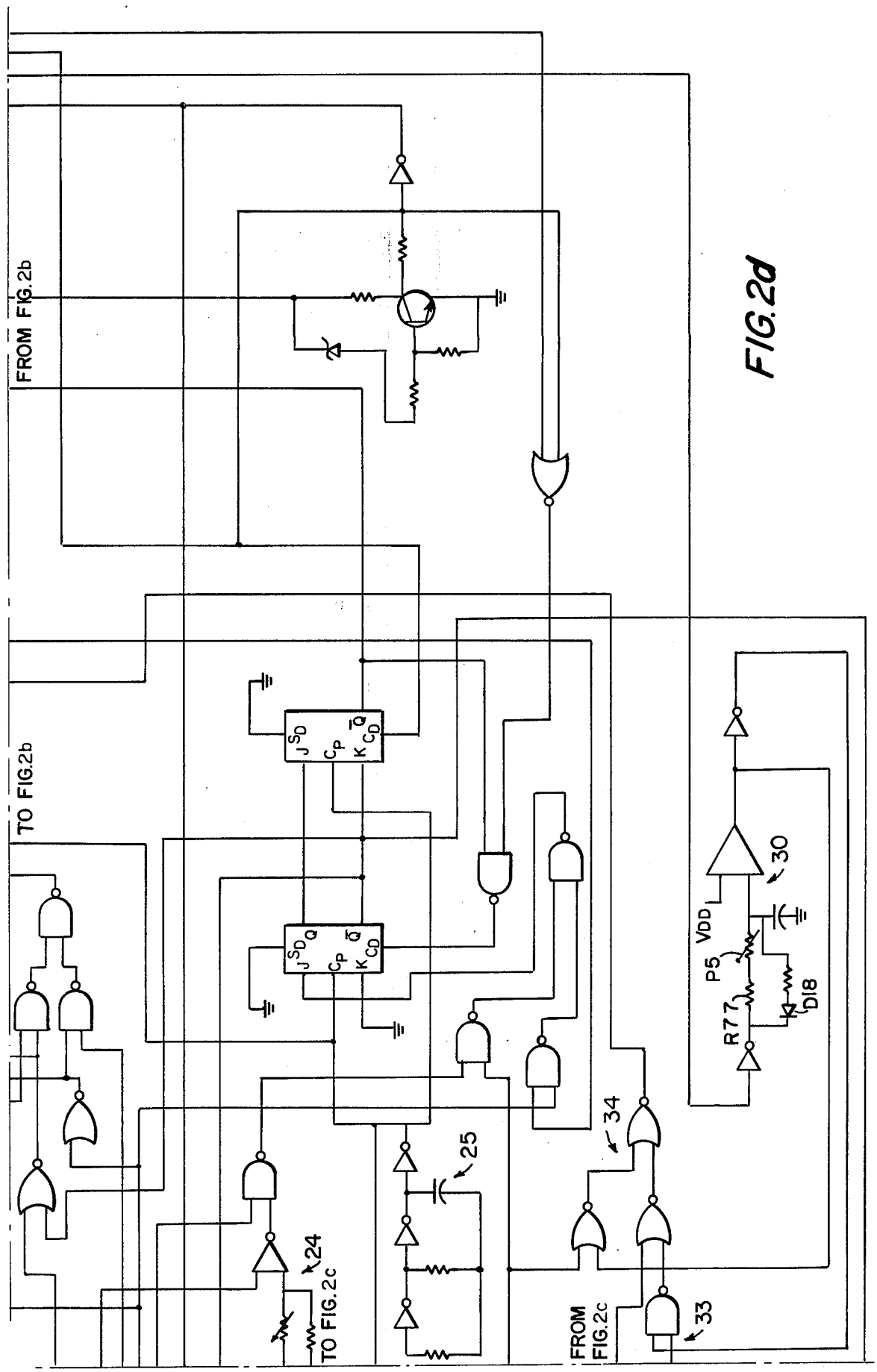

AUTOMATIC CONTROL SYSTEM FOR MACHINE TOOLS

FIELD OF INVENTION

The invention relates to a control system for machine tools and, more particularly, automatic control of the load on a rotary tool drive motor by varying the distance between the tool and the workpiece.

DESCRIPTION OF THE PRIOR ART

Systems of this general type have been in existence for some years, with automatic feed controls being applied to numerous types of machine tools. Some operations, such as surface grinding, require precise control of the feed mechanism in order to guard against material being removed too quickly or unevenly from the workpiece. This has necessitated the use of complex, expensive direct current feed motors, conventional stepper motors and power supplies to provide adequate sensitivity and precision in the control system.

Typical examples of these prior art systems may be found in U.S. Pat. Nos. 4,031,437 and 3,789,279 to E. J. Dempsey et al. and 3,389,313 to R. A. Reynolds.

SUMMARY OF THE INVENTION

In the automatic control system of the present invention, the complexity and expense of the prior art systems are overcome by controlling the duration and phase of the power supplied to an alternating current feed motor to cause it to operate with the same precision and control as a stepper motor or a direct current servo motor.

The load current level of the tool drive motor is sensed and compared to a selectable desired level, and the output of this comparison circuit is used to determine (1) whether or not actuation of the alternating current feed motor is desired, (2) the direction of rotation of the feed motor, and (3) the duration and phase of the power applied.

BRIEF DESCRIPTION OF THE DRAWINGS

FIGS. 2a, 2b, 2c and 2d are a detailed schematic diagram of the actual circuitry used in one specific embodiment of the present invention.

DETAILED DESCRIPTION OF THE INVENTION

The following description is directed to a surface grinder as exemplary of machine tools which utilize rotary tools. The purpose of this description is to simplify the understanding of the specific details of the present invention, and is intended to be construed in an illustrative and not in a limiting sense.

Figure 1:
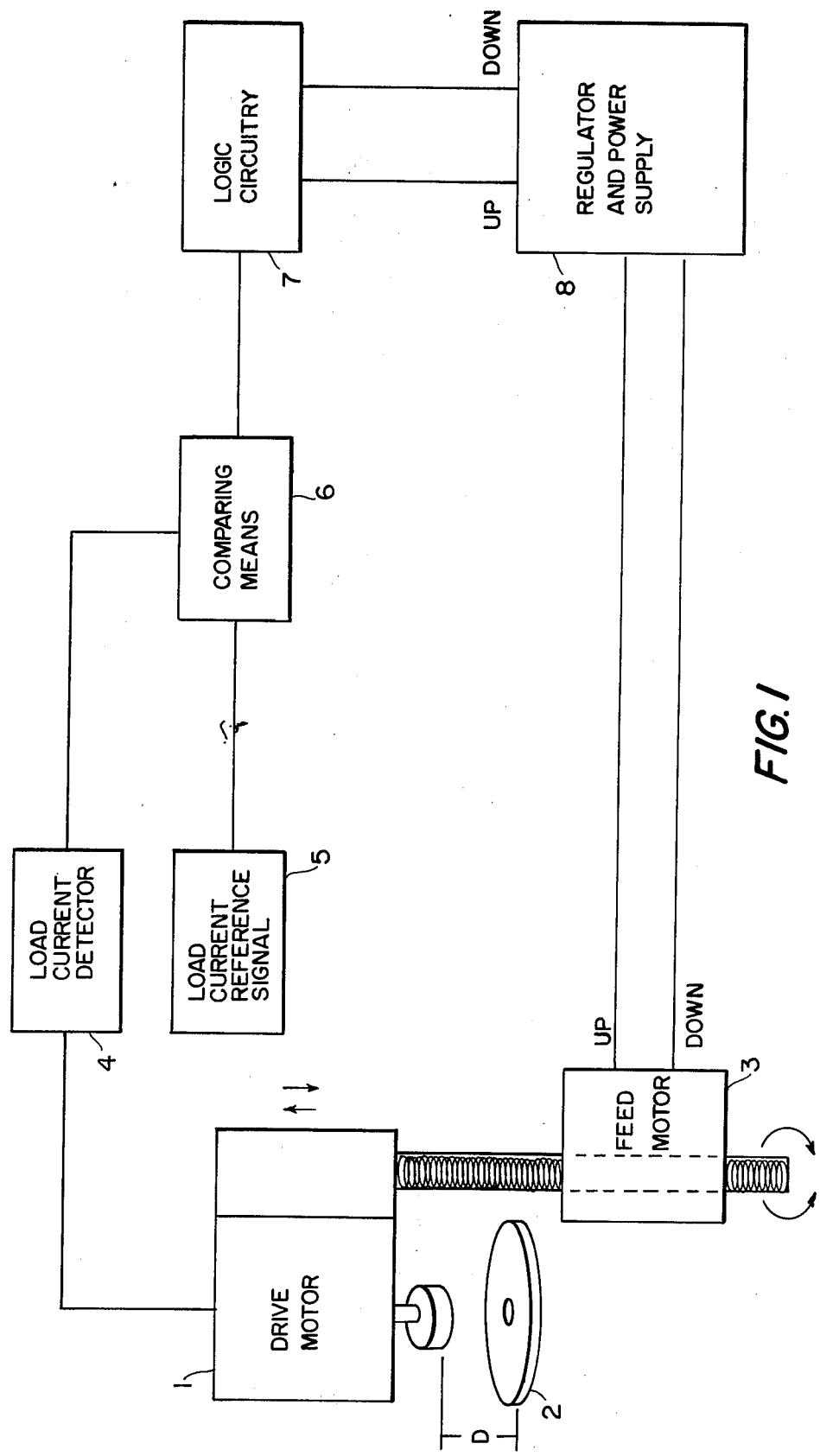
FIG. 1 is a block diagram of an automatic control system for machine tools in accordance with the present invention.

The general organization of the preferred embodiment of the invention is shown in the block diagram of FIG. 1. The distance D between tool drive motor 1 and workpiece 2 is varied by feed motor 3 in accordance with the mechanical load impressed upon drive motor 1. This load is determined by drive motor load current detector 4, and compared to a selectable load current reference signal 5 by comparing means 6. The comparing means generates an output signal only when the detected load signal differs significantly from the reference signal. When an output is generated, it is processed by logic circuitry 7 to determine whether the drive motor load is too great or too small, and it directs the regulator and power supply circuit 8 as to the duration and phase of the energization of feed motor 3 so it operates the mechanical feed mechanism in a direction which will minimize the difference between the drive motor load current signal and the load current reference signal.

Figure 3A:
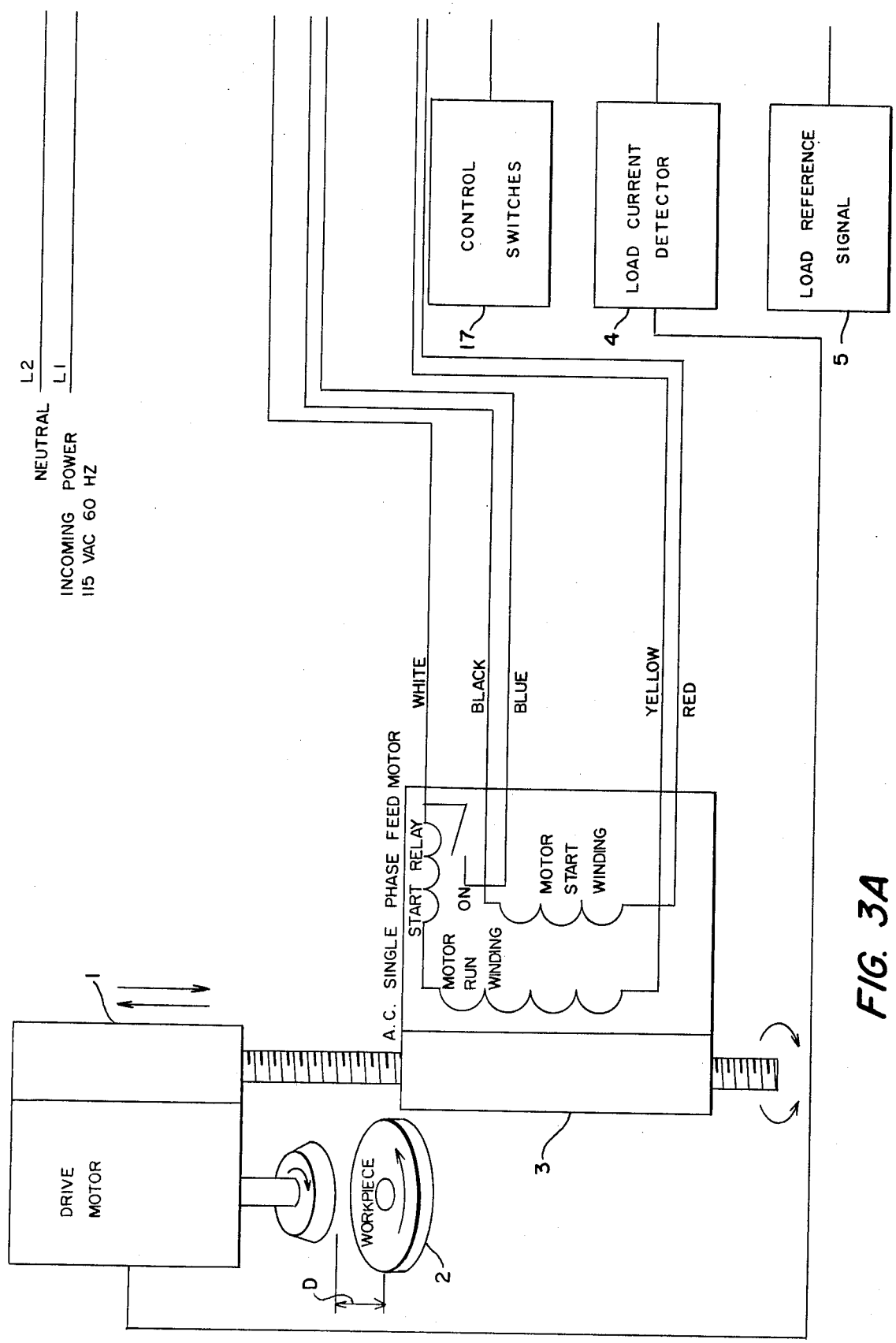
FIGS. 3a and 3b are a functional block diagram of the circuitry of FIG. 2, to more clearly define the invention and facilitate understanding of the operation of FIG. 2 by one skilled in the art.
Figure 3B:
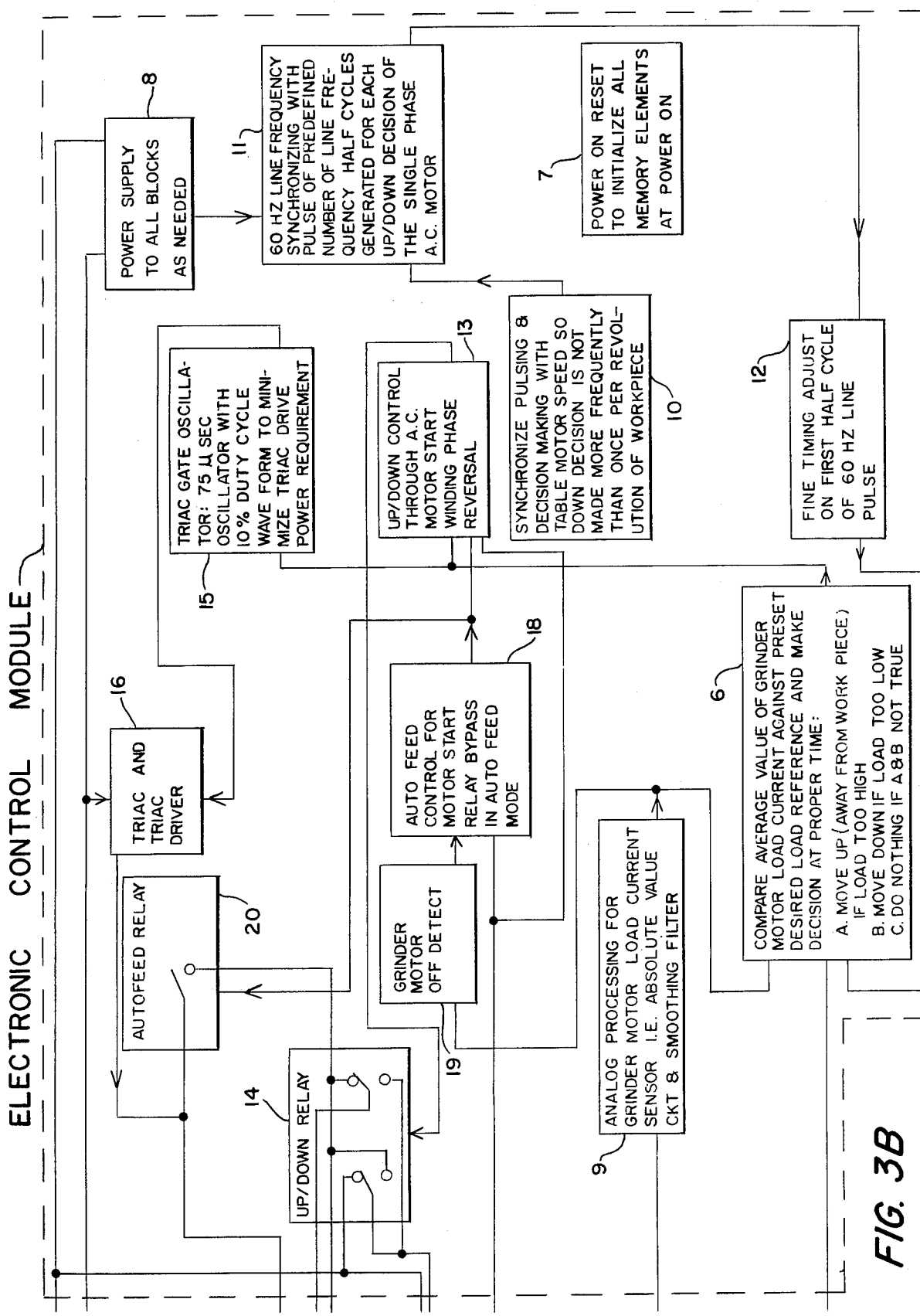

A more detailed block diagram representation of the invention is shown in FIGS. 3A and 3B. Control switches 17 permit activation of an automatic feed mode of operation through auto feed control circuitry 18 provided the grinder motor of detect circuit 19 does not sense an off condition. Auto feed control 18 actuates auto feed relay 20, which bypasses the start relay contacts of alternating current, single phase feed motor 3, applying power to both the start and run windings thereof.

The distance D between tool drive motor 1 and workpiece 2 is varied by AC single phase feed motor 3 in accordance with the mechanical load impressed upon drive motor 1. This load is determined by drive motor load current detector 4 and, after passing through analog processing circuit 9, compared to selectable load current reference signal 5 by comparing means 6. This comparing means generates an output signal only when the detected load signal differs significantly from the reference signal. The proper timing of an output signal from comparing means 6 is assured through synchronizing means 10 and 11 and timing adjustment circuit 12.

The output signal generated by comparing means 6 may indicate a drive motor load which is either greater than or less than the reference signal, and the output signal will serve to precondition up/down control 13 and up/down relay 14 prior to energization of AC single phase feed motor 3. The duration and phase of the energization of feed motor 3 are determined by triac gate oscillator 15 and triac 16. The energization pulse from triac 16 causes the output shaft of feed motor 3 to rotate a fixed, repeatable distance, operating in a manner similar to that of a more sophisticated stepper motor. The preconditioning of up/down circuits 13 and 14 will cause the drive motor and tool to move in a direction which will reduce the difference detected between the load current and reference current signals.

Power supply 8 supplies power to all elements of the electronic control module, with a power-on reset circuit 7 to initialize all memory elements in the module upon application of AC power.

The operation of the invention is described with reference to the functional block diagram of FIG. 3.

This is a system for automatically controlling the loading of an electric drive motor during a machining operation. The load on the drive motor is sensed electronically, and the drive motor head is moved toward or away from the workpiece by an alternating current feed motor to maintain the load on the drive motor at a constant level. The machine tool operator manually selects the desired load level, and the electronic load sensing and feed motor control circuits maintain the load at the selected level.

The drive motor head is moved toward or away from the workpiece in a straight line by a feed screw, said screw being turned by an electronically controlled, alternating current feed motor. The feed motor is driven in steps of fixed duration and at fixed time intervals. This "stepping" mode of control allows the system to respond to the effects of the previous step before another step is initiated.

The control system is a closed loop system in which any change in drive motor load is detected by a current sensor and fed to the electronic control circuit, which will drive the alternating current feed motor and feed screw in a direction to oppose the original change in drive motor load.

Figure 2A:
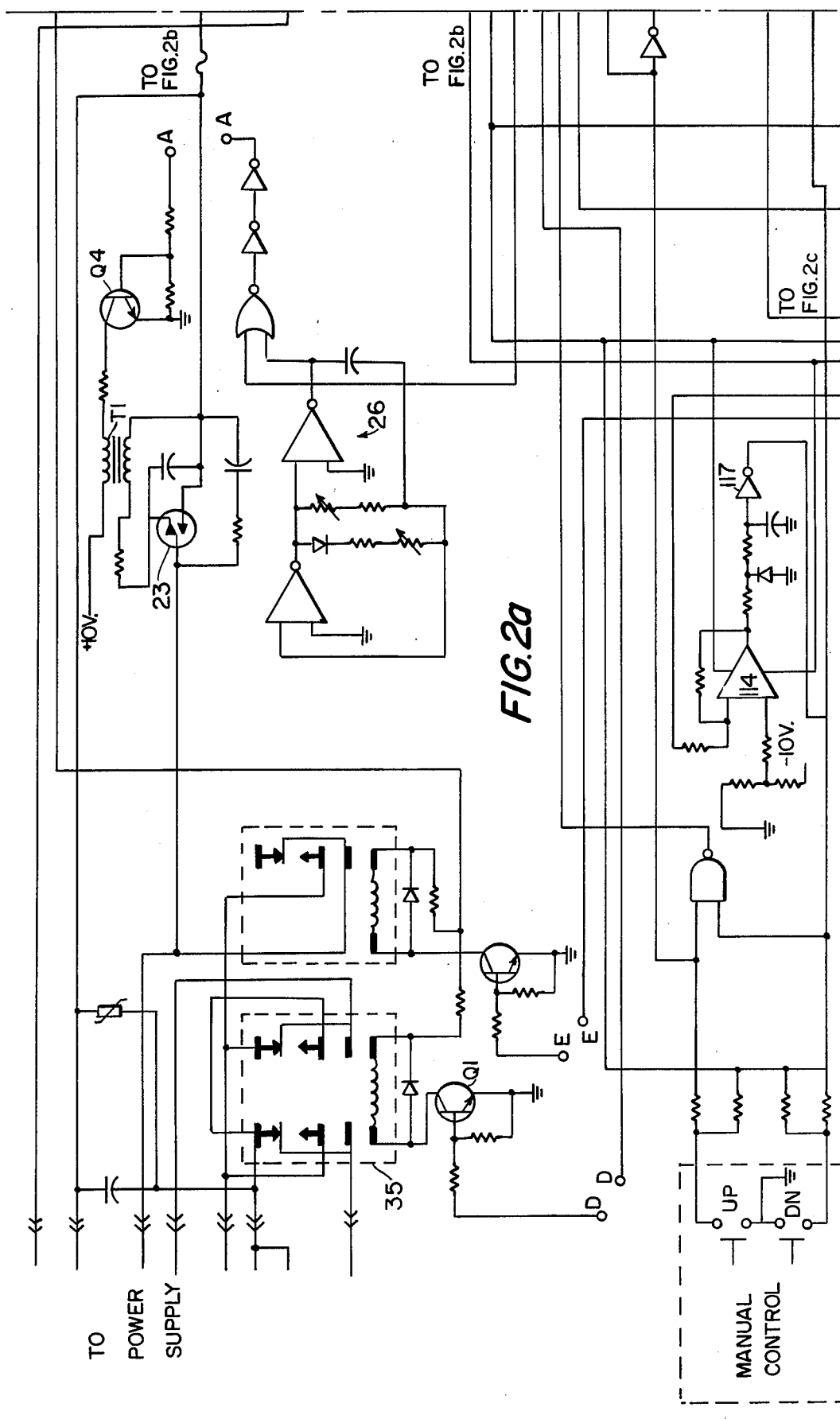
Figure 2B:
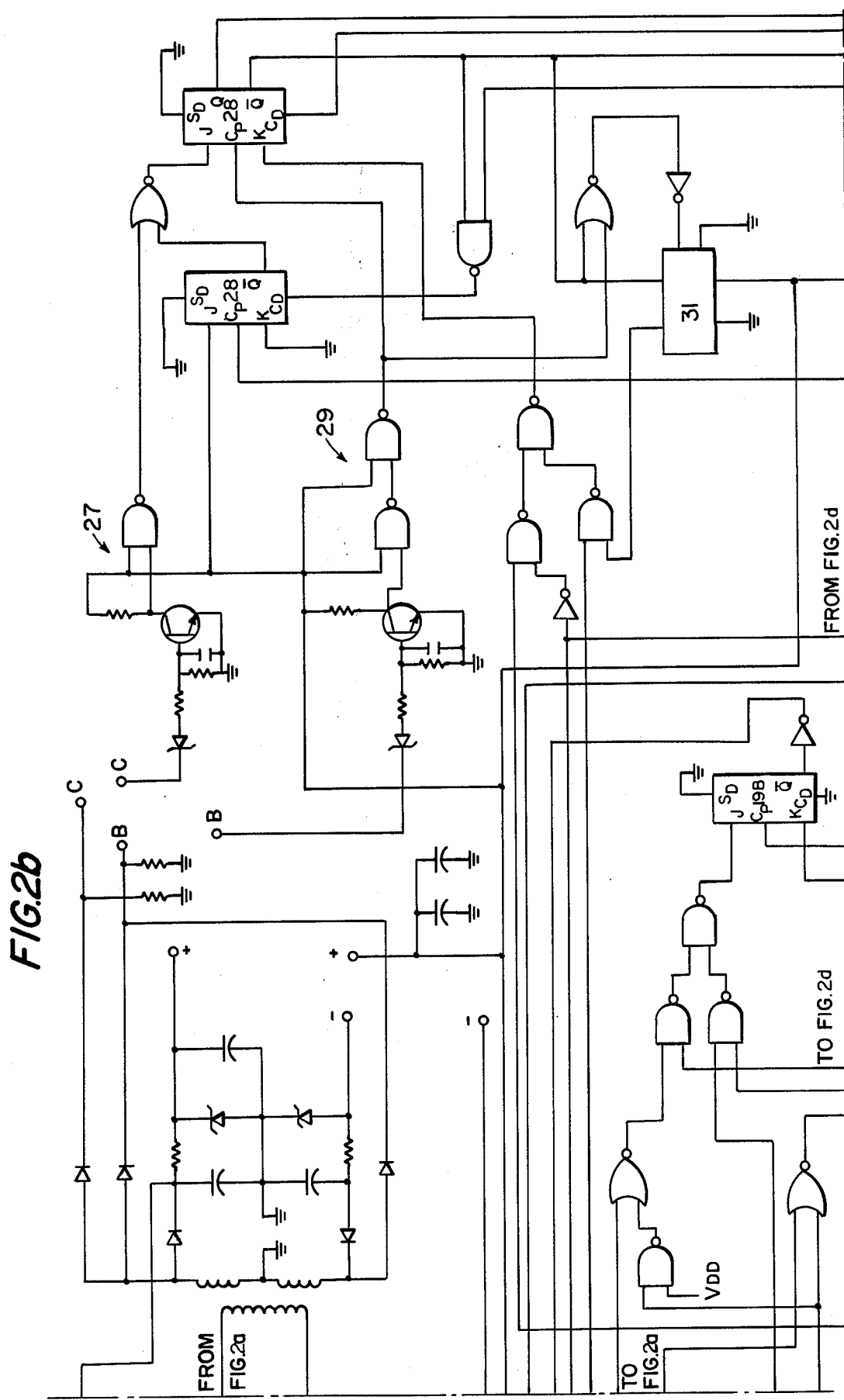

The detailed schematic diagram of FIG. 2 shows in detail the actual circuitry of one specific embodiment of the invention in the form of a surface grinder for resurfacing flywheels and clutch pressure plates. The following is a grouping of the elements of FIG. 2 to correspond with the functional blocks of FIG. 3 to provide a more complete understanding of the invention to one skilled in the art:

| FIG. 3 BLOCK | FIG. 2 ELEMENTS |
|---|---|
| 4 | load current detector 115, FIG. 2c |
| 5 | select desired load 120, FIG. 2c |
| 6 | amplifiers 116, 21, 22, flipflops 32, gates 33, 34, FIG. 2c |
| 7 | transistor, Zenerdiode to right of FIG. 2d |
| 8 | transformer, rectifier in upper left corner of FIG. 2b |
| 9 | amplifiers 111, 112, 113 and associated resistor network FIG. 2c |
| 10 | clocks 24, 25 and associated flipflops, FIG. 2d. |
| 11 | flipflops 28, clocks 27, 29, decade counter 31, FIG. 2b |
| 12 | delay circuit 30, FIG. 2d |
| 13 | flipflop 119b and associated gates, FIGS. 2b, 2d |
| 14 | relay 35, FIG. 2a |
| 15 | clock 26, FIG. 2a |
| 16 | triac 23 and driver Q4, FIG. 2a |
| 17 | manual and automatic control switches, FIGS. 2a, 2c |
| 18 | flipflop 119A, FIG. 2c |
| 19 | amplifier 114, gate 117, FIG. 2a |
| 20 | relay to right of up/down relay 35, FIG. 2a |

Various modifications may suggest themselves to those skilled in the art without departing from the spirit of the invention, and hence, the invention should not be construed as restricted to the specific forms shown or uses mentioned, except to the extent indicated in the appended claims.

What is claimed is:

1. In an automatic control system for a machine tool of the type having a rotary tool, an electrical drive motor therefor and a mechanical feed mechanism for incrementally varying the distance between such rotary tool and a workpiece, including an alternating current singlephase feed motor having an output shaft connected to such mechanical induction mechanism to drive same, means for comparing an electrical signal proportional to the load current in such electrical drive motor with a selectable reference signal, and means responsive to the output of said comparing means for controlling the application of an unconditioned alternating line current source to said feed motor, such that it turns, in a forward or reverse direction or stops, to control in an incremental manner the distance between such rotary tool and the workpiece so as to minimize the output of said comparing means, wherein said comparing means comprise a current sensor for sensing drive motor load current, a conversion circuit for converting said sensed current into a voltage signal proportional thereto, a summing amplifier which sums said voltage signal with said selectable reference signal to determine whether or not said alternating current feed motor will be incrementally driven, and a comparator which determines the direction said feed motor will be incrementally driven.

2. In an automatic control system for a machine tool of the type having a rotary tool, an electrical drive motor therefor and a mechanical feed mechanism for incrementally varying the distance between such rotary tool and a workpiece, an alternating current single phase feed motor having an output shaft connected to such mechanical induction mechanism for driving same, means for comparing an electrical signal proportional to the load current in such electrical drive motor with a selectable reference signal, and means responsive to the output of said comparing means for controlling the application of an unconditioned alternating line current source to said feed motor, such that it turns, in a forward or reverse direction or stops, to control in an incremental manner the distance between such rotary tool and the workpiece so as to minimize the output of said comparing means, wherein said means responsive to the output of said comparing means comprise gating means, clocking means for said gating means, and a variable time delay circuit responsive to said gating means for controlling the energizing current for said feed motor.

* * * * *